United States Patent [19]

Sanders

[11] Patent Number: 4,982,921
[45] Date of Patent: Jan. 8, 1991

[54] AUTOMOBILE WINDOW ARM REST

[76] Inventor: Daniel W. Sanders, 8685 Hastings St. Northeast, Blaine, Minn. 55434

[21] Appl. No.: 364,862

[22] Filed: Jun. 12, 1989

[51] Int. Cl.⁵ ............................................... B68G 5/00
[52] U.S. Cl. .................................... 248/118; 296/153
[58] Field of Search ........... 248/118; 296/65 R, 37.13, 296/153; 297/411, 416, 417, 412, 413

[56] References Cited

U.S. PATENT DOCUMENTS

| | | | |
|---|---|---|---|
| 2,462,768 | 2/1949 | Ortleb | 296/153 |
| 2,670,235 | 2/1954 | Sisil | 296/153 |
| 2,697,632 | 12/1954 | Shapiro | 296/153 |
| 2,738,220 | 3/1956 | Simmons | 296/153 |
| 2,803,493 | 8/1957 | Haefliger | 296/153 |
| 2,877,049 | 3/1959 | Lucas | 296/153 |
| 4,453,760 | 6/1984 | Hira | 296/153 X |
| 4,521,056 | 6/1985 | Lindenmuth | 297/412 |
| 4,758,043 | 7/1988 | Reynaldos | 296/153 |
| 4,805,957 | 2/1989 | Fletcher | 297/413 |

Primary Examiner—J. Franklin Foss
Attorney, Agent, or Firm—Moore & Hansen

[57] ABSTRACT

A device for providing a comfortable resting surface for the arm of an automobile driver or passenger who would like to rest their arm on the lower surface of the window opening when the window is open. This surface is frequently uncomfortable or awkward to rest an arm upon due to factors such as heat and/or surface irregularities. The arm rest includes a padded arm resting portion on which the user places his or her arm. The arm rest is useable on any vehicle, and is attached on an inner wall beneath a window opening. It may then be folded into place for use by the user. The arm rest is easily positioned for use and, should the user be the vehicle operator, it does not require the use of both hands or other awkward maneuvers to place it in the appropriate position for use, thus minimizing distraction to the driver and the risks involved therewith. Further, the arm rest is inexpensive to manufacture and is made of easily cleaned materials. A storage compartment is also provided within the arm resting portion for the convenient storage of small items.

7 Claims, 1 Drawing Sheet

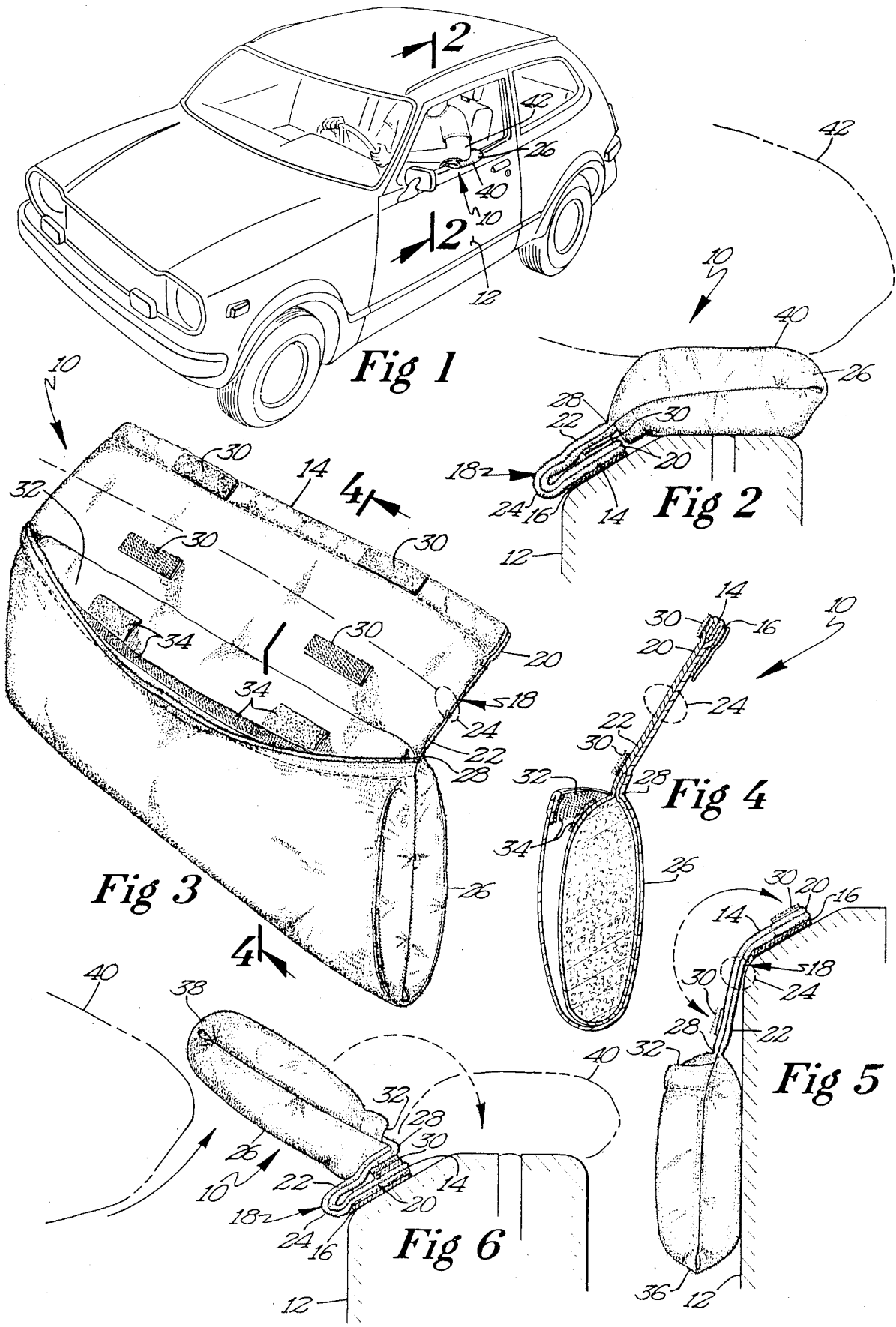

AUTOMOBILE WINDOW ARM REST

BACKGROUND OF THE INVENTION

1. Technical Field

This invention relates to devices which enable the user to comfortably rest his or her arm on the upper edge of a car door when the window has been rolled down. The device prevents the user's arm from being burned by the metal of the door, which is frequently quite hot in the summer after prolonged exposure to direct sunlight, and also provides a soft, cushioned surface rather than a hard, uneven surface. Specifically, this invention relates to an arm rest, including a storage pouch or pocket, foldable between a storage position, an intercept position and a use position. Further, this invention relates to a device which may be used as described above on a variety of vehicles, including cars, trucks and boats. Additionally, this invention relates to a device which provides a storage compartment therein providing an additional location for stowing small items within the vehicle.

2. Background Information

It is common practice among many automobile riders, both drivers and passengers, to open the window of the vehicle nearest them when the weather is pleasant in order to enjoy the outside air and the benefits of improved ventilation. Many of these riders also find resting an arm on the surface at the lower edge of the window opening a comfortable position as they drive or ride along. Unfortunately, features of this surface may indeed create a great deal of discomfort to the arm resting thereon. For example, if the sun has been shining directly on the exposed metal surfaces adjacent to the lower edge of the window opening, the metal generally becomes quite hot to the touch, which is at best extremely uncomfortable. Further, this arm rest surface may be very irregular, with uncomfortable, hard edges protruding into the arm of the rider. These hard, uneven edges may be from the upper part of the window itself, which may not have fully recessed into the door or window storage compartment; from the chrome trim that is frequently found along the outer edge of the window opening; or from the rubber gasket that is frequently used to keep dirt and moisture out of the window storage compartment.

Many earlier attempts have been made to provide the automobile rider with a comfortable surface on which to rest his or her arm. As early as June 19, 1928, U.S. Pat. No. 1,674,205 issued to Johnson describing an arm rest that was fixedly attached to the inner surface of the vehicle adjacent the edge of the window opening. The arm rest consisted of an upholstered rest plate which rotated about a metal hinge between an internal use/storage position and an external use position. However, when the rider's arm was no longer using the arm rest after using it in the external use position, the arm rest would remain in that position, continuing to be unnecessarily exposed to dirt and other elements, allowing the fabric of the arm rest to become increasingly dirty and unattractive. Further, the metal hinge was prone to rusting should the hinge become wet during rain. The rusty hinge would then inhibit the function and usefulness of the arm rest.

Other prior art armrest devices would removably attach to the door by means of an insert or series of inserts which fit into the upper portion of the window storage compartment between the inner surface of the window and the inner edge of the window frame. U.S. Pat. Nos. 1,695,549 issued to Hausler on Dec. 18, 1928, 1,760,450 issued to Taylor on May 27, 1930, and 2,670,235 issued to Susil on Feb. 23, 1954 illustrate devices of this type. The Hausler and Taylor devices, however, only provided an armrest on the inside of the car door for the cars which did not otherwise have one built in, as is standard in many cars currently produced. The Susil reference does provide an arm rest for the surface of the window opening and utilizes fabric hinges, but does not return to an intercept or engagement position after the user's arm is removed therefrom and allows the arm rest to remain exposed to the elements, becoming unnecessarily dirty. Further, the device must be removed when not in use and the window is closed because the hinged portion of the arm rest would otherwise project into the passenger compartment. Finally, as with the other prior art references, there is no storage pouch or pocket provided by this device.

U.S. Pat. No. 2,462,768 issued to Ortleb on Feb. 22, 1949 also illustrates an arm rest with a window opening insert, but does not take up space in the passenger compartment when not in use as does the Susil device. Nevertheless, the Ortleb device does not provide any padding for the resting of the user's arm, providing instead only a relatively thin layer of plastic or other fabric on which to rest the arm.

Applicant has also developed a prior version of an automobile arm rest, identified in copending design Pat. application Ser. No. 101,557 filed Sept. 28, 1987, which includes the window compartment insert found in certain of the prior art patents described above. Applicant's earlier version includes a rigid frame for holding an interior arm rest in place. However, the rigid frame, although covered by a protective layer of fabric to minimize discomfort and the possibility of damage to the surface of the automobile, is subject to bending in the event of mishandling, rendering the device less useful and more awkward to handle. The device provides a foldable arm protection portion which protects the arm as it rests on the lower edge of the window opening, the arm protection portion being difficult to place in the use position. In the event that the user should be the driver, the user must either remove his right hand from the steering wheel to position his left arm for use of the arm rest, or the user must maneuver about in her seat in order to attain a position in which the arm rest may be placed in the use position by us of the left hand only. In either event, the driver runs at least a slight risk of losing control of the car. Applicant's earlier version also lacks any storage means within the arm rest.

Yet another version developed by Applicant includes a padded arm protection portion attached to the inner wall of a vehicle just beneath a window opening by a reattachable means such a VELCRO. This arm rest version rotates between exterior and interior positions.

With this background in mind, a portable automobile arm rest which is easy to use and easy to clean has been developed.

SUMMARY OF THE INVENTION

The present invention is intended to provide a convenient, durable means for protecting the arm of a vehicle driver or passenger from the sometimes hot, uneven or otherwise uncomfortable surface of the lower edge of a vehicle window opening when the window is rolled down. In its preferred embodiment, the invention is provided with a means for attachment to the inside of a vehicle wall just below the window opening. One portion of the invention may then be positioned for easy engagement by the arm of the user and folded up and over the lower edge of the window opening when the window has been rolled down, providing a protective, padded surface on which the vehicle driver or a passenger may rest his or her arm, protecting the user's arm from the heat, roughness or other discomforts frequently related to the surface at the bottom of the window opening.

One object of the invention is to provide a portable, easily detachable means for protecting a user's arm resting on the lower surface of the window opening. Another object of the invention is to make the arm rest of a structure and material that is easily cleaned after prolonged use.

Another object of the invention is to provide an arm rest which may be conveniently stored on the wall of the vehicle in which it has been installed even when not in use, so as not to take up space in the limited storage space usually found in most vehicle interiors. A further object of the invention is to provide a storage pouch or pocket within the arm rest to increase the amount of storage space found in the vehicle.

Another object of this invention is to provide an automobile arm rest which is easily engaged for use by a user, especially when the user is the driver, so as not to overly distract the driver. It is an object to make the arm rest thus easily engageable without leaving it in the use position when not being used so as to minimize its exposure to dirt, which would soil the arm rest more than necessary, and wind, which could cause the arm rest to become detached from the inner wall of the vehicle to which it is attached.

These and further objects and advantages of the invention will be readily understood as the following description is read in conjunction with the accompanying drawings, wherein like reference numerals have been used to designate like elements throughout the several views.

BRIEF DESCRIPTION OF THE DRAWINGS

FIG. 1 is a perspective view of an automobile with the invention installed and in normal use;

FIG. 2 is an end view of the arm rest in the use position taken along line 2—2 of FIG. 1;

FIG. 3 is a perspective view of the arm rest showing the various attachment means, with the lip of the storage portion turned out slightly;

FIG. 4 is a section view of the arm rest in the storage position taken along line 4—4 of FIG. 3;

FIG. 5 is an end view of the arm rest in the storage position from the same perspective as FIG. 2; and FIG. 6 is an end view of the arm rest in the intercept position from the same perspective as FIG. 2.

DESCRIPTION OF THE PREFERRED EMBODIMENT

With reference to the drawings, and in particular to FIG. 3, the portable arm rest for automobiles and other vehicles is generally indicated by reference numeral 10. As may be seen in FIGS. 1, 2, 5 and 6, the arm rest 10, here shown mounted on the inside of an automobile door 12, attaches to the door along a wall attachment portion 14. The wall attachment portion 14 uses an attachment means, such as a VELCRO strip 16, for attaching to the door. Use of a VELCRO strip 16 enables the arm rest 10 to be easily removed from and reattached to the car door 12.

As is more clearly shown in FIGS. 3 and 4, the wall attachment portion 14 is contiguous with and a portion of flap portion 18. Flap portion 18 is divided into a first segment 20 and a second segment 22, with wall attachment portion 14 being a part of first segment 20. The two segments 20, 22 are divided by a first hinge means 24 along which the flap portion 18 may be folded. Flap portion 18 is attached to and projects from an edge of arm resting portion 26 along a second hinge means 28. Releasable attachment means 30, such as VELCRO strips, are positioned on the flap portion 18, with mating parts of the releasable attachment means 30 being opposably positioned on differing segments 20, 22 of the flap portion 18 so as to permit the fixed positioning of the flap portion 18 in a folded position with the fold being located along the first hinge means 24. With the flap portion 18 thus folded and held in place by releasable attachment means 30, the arm resting portion 26 may pivot about second hinge means 28 between the resting or use position 40 illustrated in FIGS. 1 and 2 and the arm intercept position 38 illustrated in FIG. 6.

The arm rest 10 is preferably covered with a washable material, such as velour. Arm resting portion 26 also contains padding. In the preferred embodiment, no metal parts are used. This results in easier cleaning and the elimination of the chance of rust. It is further preferred that all exposed elements of the arm rest be constructed of washable materials, to further minimize the corrosive effects of exposure to the environment.

Referring to FIG. 4, access to the storage portion 32, contained within arm resting portion 26, is gained in the preferred embodiment from the edge of the arm resting portion 26 adjacent the flap portion 18. The storage portion 32 may be releasably sealed with sealing means 34, again preferably incorporating strips of VELCRO material. When sealed with sealing means 34, the likelihood of the contents of the storage portion 32 being inadvertently spilled therefrom is greatly reduced. An alternative embodiment of the device permits access from the edge of the flap portion 18 opposite the edge along which the flap portion 18 is joined to the arm resting portion 26.

In operation, the arm rest 10 of the preferred embodiment is attached in most cases to a car door just beneath and adjacent to the lower edge of the window opening on the inside of the car door. The attachment is accomplished by placing a strip of sticky-backed VELCRO on the car door at the specified location, and fastening the arm rest 10 in place with a corresponding VELCRO strip found on the wall attachment portion 14. With attachment means 30 detached, the arm resting portion 26 hangs in a storage position 36 as illustrated in FIG. 5, leaning against the inside surface of the car door. In this position, the storage portion 32 is accessible, allowing items stored within to be removed or new ones inserted, after releasing the sealing means 34. When the arm rest 10 is to be used, attachment means 30 should be joined, thereby positioning the arm rest 10 in the arm intercept position 38 illustrated in FIG. 6. The user may then simply raise his or her arm 42 to the arm resting portion 26 as shown in FIG. 6 and, in a single continuous motion the user's rising arm 42 encounters the rest 10 at the intercept position 38 and moves it to the resting or use position 40, at which time the user will position his arm thereon, as shown in FIG. 2. When the user removes his arm from the arm resting portion 26, a combination of the resilient force of the fabric at the second hinge means 28 and the wind forces passing the moving automobile causes the arm resting portion 26 to return from the resting position 40 to the arm intercept position 38 illustrated in FIG. 6.

It is anticipated that various changes may be made in the size, shape, and construction of the automobile window arm pad disclosed herein without departing from the spirit and scope of the invention as defined by the following claims.

What is claimed is:

1. An arm rest useable with a vehicle wall having a window, comprising:
   an arm resting portion;
   a flap portion projecting from said arm resting portion, said flap portion having a first segment and a second segment, said flap portion including:
      a vehicle wall attachment portion integral with said first segment of said flap portion;
      first hinge means integral with said flap portion and dividing said first segment of said flap portion from said second segment of said flap portion; and
      first attachment means adjacent said first hinge means for releasably attaching said first segment of said flap portion to said second segment of said flap portion, said flap portion having a first position wherein said first attachment means is disengaged and a second position wherein said first attachment means is engaged;
   second hinge means between said arm resting portion and said flap portion, whereby, with said flap portion in said first position, said arm resting portion rests against an inner vehicle wall in a storage position and, with said flap portion in said second position, said arm resting portion rotates about said second hinge means between an arm intercept position, wherein the arm of a user may easily come into contact with said arm resting portion prior to positioning for use by the user, and a use position, wherein the arm of the user is positioned in resting contact with said arm resting portion, whereby the natural arm movement of the user to said use position will swing said arm resting portion from said arm intercept position to said use position; and
   second attachment means for attaching said vehicle wall attachment portion to a vehicle wall.

2. An arm rest as defined in claim 1, wherein:
   said arm resting portion includes a cushioned material.

3. An arm rest as defined in claim 1, wherein:
   said first and second hinge means are comprised of non-metallic, non-corrosive materials.

4. An arm rest as defined in claim 3, wherein:
   said second hinge means is comprised of resilient fabric materials which, when folded along the axis of said second hinge means, cause said arm resting portion to be biased toward said arm intercept position from said use position after the arm of the user is withdrawn from resting contact with said arm resting portion.

5. An arm rest as defined in claim 1, further comprising:
   an integral storage compartment.

6. An arm rest as defined in claim 5, wherein:
   said integral storage compartment is contained within said arm resting portion.

7. An arm rest as defined in claim 6, further comprising:
   flexible closure means for releasably sealing said integral storage compartment in a closed, secure position, whereby items stored within said integral storage compartment may not inadvertently be displaced therefrom.

* * * * *